Patented Nov. 16, 1926.

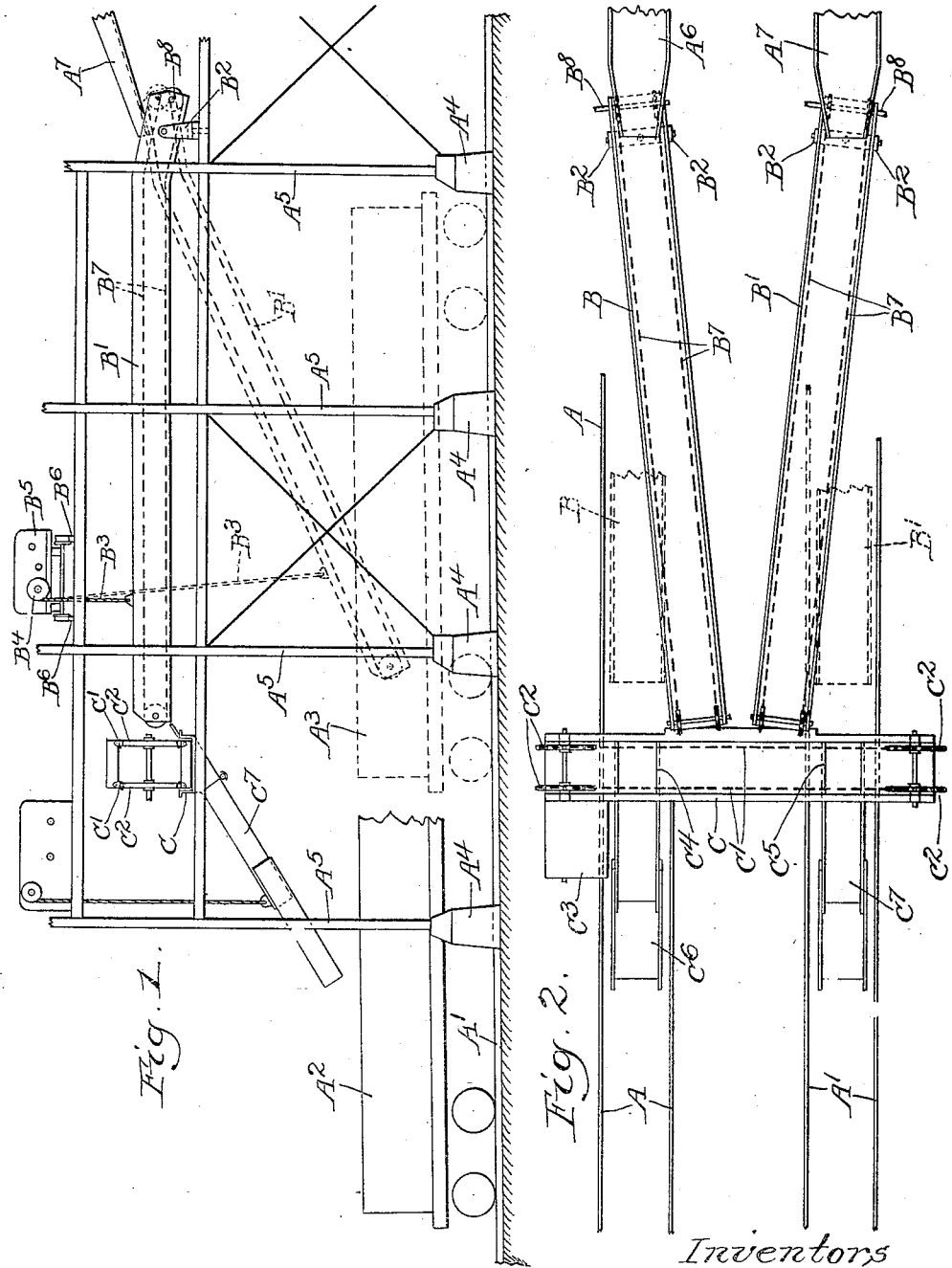

1,606,793

UNITED STATES PATENT OFFICE.

GEORGE S. JAXON, OF HUNTINGTON, WEST VIRGINIA, AND JOHN W. WILSON, OF CHICAGO, ILLINOIS, ASSIGNORS TO LINK-BELT COMPANY, OF CHICAGO, ILLINOIS, A CORPORATION OF ILLINOIS.

APPARATUS FOR AND PROCESS OF HANDLING MATERIAL.

Application filed December 16, 1925. Serial No. 75,860.

Our invention relates to improvements in coal handling machinery and particularly to apparatus for and process of handling materials such as coal. One object of our invention is to provide means whereby the coal or similar comminuted or fragmentary material may be received from the tipple or picking tables and discharged in a series of different combinations to cars for shipment. Another object of our invention is to provide an apparatus which will be flexible and lend itself to easy and convenient control of the mixture of material or the handling of it. Other objects of our invention will appear from time to time throughout the specification and claims.

Our invention is illustrated more or less diagrammatically in the accompanying drawings, wherein:

Figure 1 is a side elevation;
Figure 2 is a plan view.

Like parts are indicated by like characters throughout the specification and drawings.

For convenience we have illustrated the tipple and coal picking machinery showing merely the chutes or booms whereby material is distributed or loaded on the cars as our invention resides particularly in that part of the apparatus.

A $A^1$ are tracks on which cars $A^2$ $A^3$ may be spotted in the usual manner. $A^4$ are pedestals carrying uprights $A^5$ to support the working floors of a boom house. $A^6$ $A^7$ are chutes leading from the picking table, the chute $A^6$ being perfectly adapted to discharge material from the egg table and the chute $A^7$ from the lump table or picking screens not here shown.

B is an egg boom receiving egg coal from the chute $A^6$. $B^1$ is a lump boom receiving lump coal from the chute $A^7$. These booms are pivoted on supporting cradles $B^2$ for rotary movement about horizontal axes and the cradles $B^2$ are pivoted for rotary movement about vertical axes. Cables $B^3$ support the free ends of the booms depending downwardly from drums $B^4$ on hoisting carriages $B^5$ adapted to travel transversely along tracks $B^6$. The booms thus comprise endless conveyor chains $B^7$ driven by power applied to shafts $B^8$ by any suitable means not here shown. The drums $B^4$ may be operated electrically under control of the operator to raise and lower the booms and the windlass carriages may move back and forth through the tracks to rotate the booms about the vertical axes.

With the booms in the dotted position in Figure 2, they are parallel with the center line of the track and discharge each boom separately into a car on the track. In this case one car will receive egg coal and another car lump or other suitable grades depending on what is fed from the picking tables. When they are in the full line position, they are raised and inwardly inclined as indicated discharging into a trough C. This trough has in it an endless conveyor chain $C^1$ traveling over sprockets $C^2$ driven by a motor $C^3$. This motor is reversible and the chain may move in either direction to convey coal or other material to the right or to the left along the trough C. The material carried longitudinally along this trough drops through the ports $C^4$ or $C^5$ to the inclined chutes $C^6$ or $C^7$. When the booms are in the position shown in Figure 2, they both discharge into the cross trough between the discharge openings so that the movement of the conveyor controls the direction in which the discharge from both booms is carried and when operating in the position shown, the material from both picking tables, that is,—both the lump and egg is mixed and discharged simultaneously to a single car.

This arrangement makes it possible for the operator thus to discharge the product of the picking tables separately or mix it and discharge it to the car together, and also makes it possible to load cars on either track with the same mixture. Also since the chutes $C^6$ and $C^7$ are spaced along the track with respect to the chutes B $B^1$, it becomes possible to load both sizes into cars on the same track by allowing one of the booms to discharge direct to the car and having the other boom discharge to the cross conveyor and thence to the chute to a car on the same track differently spaced therealong.

It will be evident that while we have shown in our drawings, an operative device still many changes might be made in the size, shape and arrangement of parts without departing materially from the spirit of our invention and we wish, therefore, that our showing be taken as in a sense diagrammatic.

We claim:

1. In a material handling apparatus, a plurality of loading booms, means for conveying material therealong, a cross conveyor adapted to receive material from said booms, convey it laterally and discharge it and means for positioning said booms selectively to discharge onto said conveyor or to discharge material at a point removed therefrom.

2. A material handling apparatus comprising a plurality of car tracks, a conveyor extending transversely thereof, chutes leading from either end thereof and adapted to discharge by gravity to cars on said tracks, and means for operating the conveyor to discharge material carried thereby into one or the other of said chutes selectively, a plurality of conveyor booms, means for supplying material to them, means for positioning said conveyor booms to discharge selectively to said conveyor or to cars on the track.

3. In a material handling apparatus comprising a plurality of loading booms, a cross conveyor adapted to receive material therefrom for selectively discharging material from separate sources to separate cars or for mixing the material after discharging from the loading boom and simultaneously discharging it to a car.

4. In a material handling apparatus comprising a plurality of car tracks, a conveyor extending transversely thereof, a plurality of loading booms and means for selectively positioning said booms to discharge separately to cars on said tracks or simultaneously to the cross conveyor.

5. In a material handling apparatus comprising a plurality of car tracks, a conveyor extending transversely thereof, a plurality of loading booms and means for selectively positioning said booms to discharge separately to cars on said tracks or simultaneously to the cross conveyor and means associated with the cross conveyor for discharging material to said booms to cars on either one of the tracks.

6. In a material handling apparatus comprising a plurality of car tracks, loading booms arranged above each track, a cross conveyor extending transversely of said tracks, means for raising and lowering said booms and for swinging them laterally to cause them to discharge into cars on said tracks or to discharge into the cross conveyor.

7. In a material handling apparatus, a plurality of car tracks, loading booms located one above each track, a cross conveyor located above the track, the booms being mounted for rotation about vertical and horizontal axes to permit them selectively to discharge each into a car on the track beneath it or each into the conveyor above the track.

8. In a material handling apparatus, a plurality of car tracks, loading booms located one above each track, a cross conveyor located above the track, the booms being mounted for rotation about vertical and horizontal axes to permit them selectively to discharge each into a car on the track beneath it or each into the conveyor above the track at a point between the tracks.

9. In a material handling apparatus, a plurality of car tracks, loading booms located one above each track, a cross conveyor located above the track, the booms being mounted for rotation about vertical and horizontal axes to permit them selectively to discharge each into a car on the track beneath it or each into the conveyor above the track, and means associated with said conveyor for discharging material selectively onto a car on either one of said tracks.

10. In a material handling apparatus, a plurality of car tracks, loading booms located one above each track, a cross conveyor located above the track, the booms being mounted for rotation about vertical and horizontal axes to permit them selectively to discharge each into a car on the track beneath it or each into the conveyor above the track at a point between the tracks and means associated with said conveyor for discharging material selectively onto a car on either one of said tracks.

11. In a material handling apparatus, a plurality of loading booms mounted side by side, means for conveying material therealong, and a transverse conveying member adapted to receive material from said booms.

12. In a material handling apparatus, a plurality of loading booms mounted side by side, means for conveying material therealong, a transverse conveying member adapted to receive material from said booms, and a plurality of discharge members associated with said transverse conveying member and adapted to discharge material received therefrom.

13. In a material handling apparatus, a plurality of loading booms mounted side by side, means for conveying material therealong, a transverse reversible conveying member adapted to receive material from said booms, and a plurality of discharge members associated with said transverse reversible conveying member and adapted to discharge material received therefrom.

14. In a material handling apparatus, a plurality of loading booms mounted in parallelism, a plurality of parallel tracks, one of said loading booms overlying each of said tracks, means for conveying material along such booms, a transverse conveying member adapted to receive material from said booms, and a plurality of discharge members, adapted to receive material delivered thereby and discharge said material over said tracks.

Signed at Huntington, in the county of Cabell, and State of West Virginia, this 8th day of December 1925.

GEORGE S. JAXON.

Signed at Chicago, in the county of Cook and State of Illinois, this 11th day of December 1925.

JOHN W. WILSON.